Patented Mar. 23, 1954

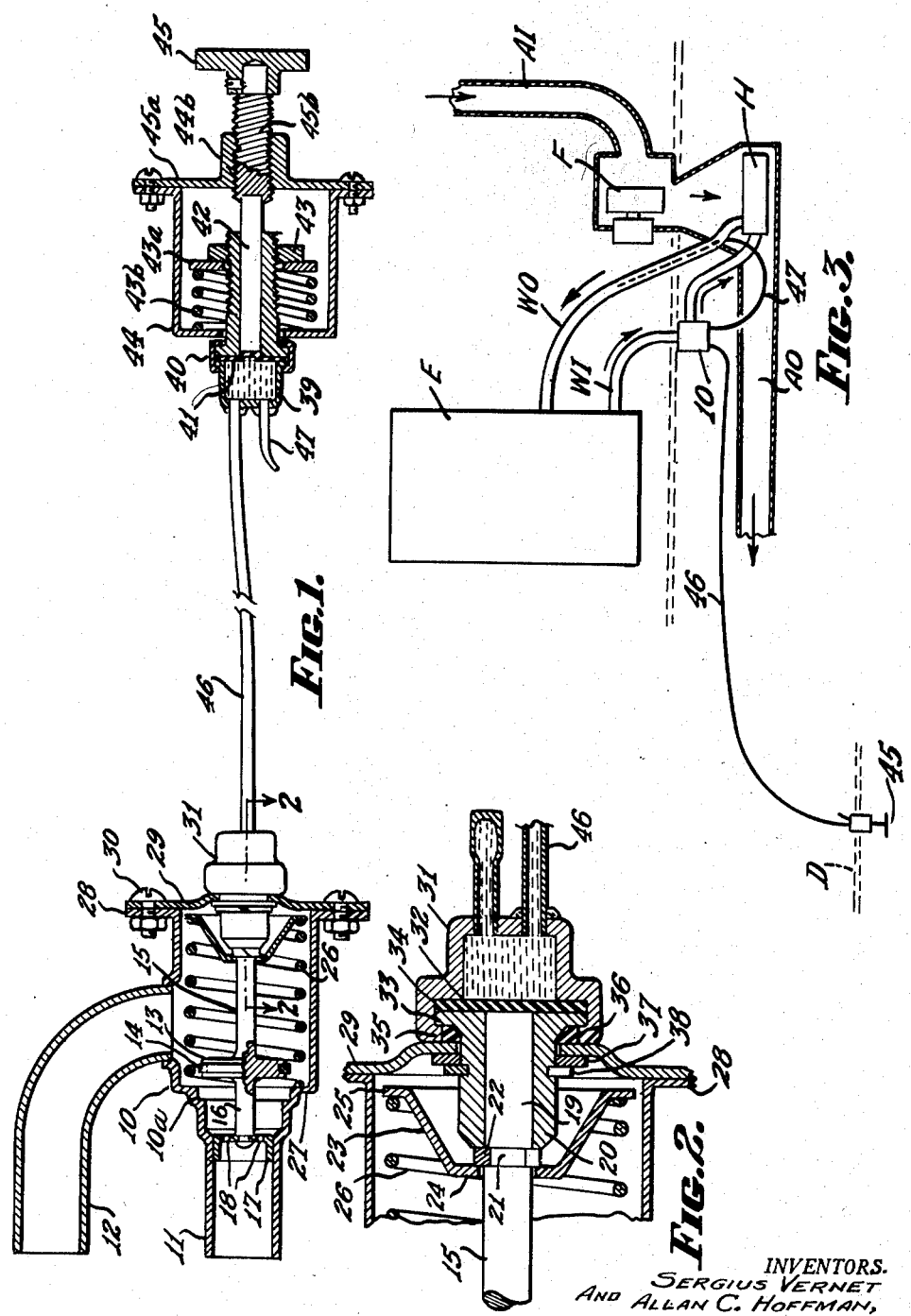

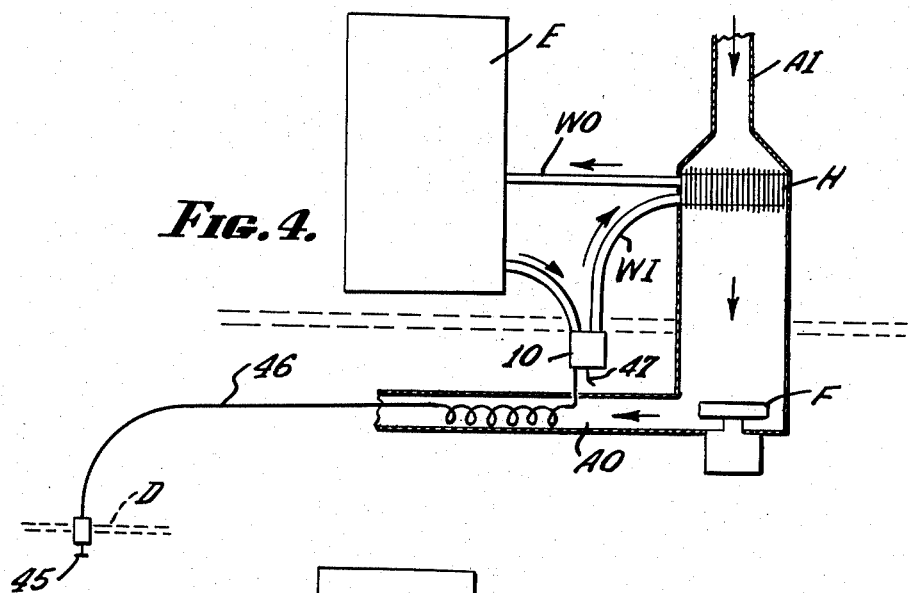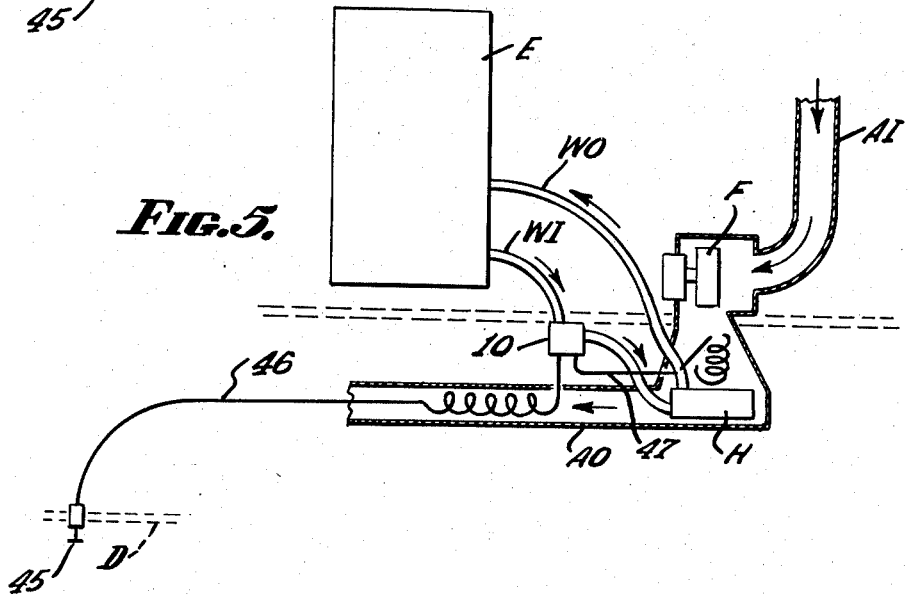

2,673,038

UNITED STATES PATENT OFFICE 2,673,038

THERMOSTATIC HOT-WATER HEATING SYSTEM FOR AUTOMOBILES

Sergius Vernet and Allan C. Hoffman, Yellow Springs, Ohio, assignors to Vernay Laboratories Inc., Yellow Springs, Ohio, a corporation of Ohio Application April 19, 1950, Serial No. 156,780

3 Claims. (Cl. 237—8)

This invention relates to a thermostat and a thermostat system and more particularly to a thermostat and system useful in connection with the control of hot water heating systems for automobiles. As pointed out in the copending application of Allan C. Hoffman, Serial No. 87,220, filed April 13, 1949, now Patent No. 2,634,057, a study of the relationship between outside air temperature, ram air temperature, water temperature in and out of the heater, air temperature in and out of the heater and car temperatures in connection with speeds of travel have shown that changes in water flow and air and water and air temperatures were of considerable magnitude during normal driving operations. It was found that while both air flow and water flow increase as the car speed increases the proportionate relationship from the heat balance standpoint does not hold throughout the normal driving speed of an automobile.

Further, according to the disclosure of the said copending application, best results have been obtained when the temperature of the passenger compartment is controlled by controlling the flow of water through the heater. Preferably this is done by actuating the water valve in response to changes in the temperature of water coming from the heater.

There are however other temperatures which, as pointed out above, are important in controlling the temperature of the passenger compartment. In the first place, the temperature of the ambient air in the compartment to which the passengers are subjected must be considered. Secondly, it is important to consider the temperature of the hot air issuing from the heater. It is important also to determine the temperature of the outside air entering the heater, and it is also important in many cases to determine the temperature of the water returning from the heater core to the engine radiator.

With the foregoing considerations in mind, it is an object of our present invention to provide a thermostat system and a specific thermostat which is capable of sensing temperature changes in various locations so that the actual control of the water valve will be based not just on sensings of ambient temperature in the passenger compartment or on sensings of temperature of the air issuing from the heater or on sensings from any other single source. According to our preferred embodiment the sensings are obtained from a number of different points, and the ultimate operation of the valve is a function of changes in various sensings.

Ancillary to the foregoing object is the object of providing a thermostat system of a particular nature having a sensing element or elements which can be disposed in a plurality of different locations to obtain a combined or integrated sensing.

Yet another object of our invention is the provision of a device as outlined above in which manual control means are provided so that the full closed or full open positions of the valve can be changed manually when conditions require such a change.

One of the basic objects of our invention lies in the provision of an arrangement whereby the sensing element is utilized to transmit motion from the manual control to the valve.

These and other objects of our invention which will become clear to those skilled in the art upon reading these specifications, or which we shall explain in more detail hereinafter, we accomplish by that certain construction and arrangement of parts of which we shall now describe several exemplary embodiments.

Reference is made to the drawings forming a part hereof and in which:

Figure 1 is a general fragmentary cross sectional view of a device according to our invention.

Figure 2 is an enlarged cross sectional view taken on the line 2—2 of Figure 1.

Figure 3 is a diagram showing one way in which the device of Figure 1 may be incorporated with an automobile heating system.

Figure 4 is a view similar to Figure 3 showing another embodiment thereof, and

Figure 5 is a view similar to Figures 2 and 4 showing still another embodiment thereof.

Briefly, in the practice of our invention we provide a sealed system charged with a liquid which changes in volume in response to changes in temperature and which will maintain a fairly constant viscosity over a temperature range from about −40° F. to about +212° F. The sealed system is provided with a cylinder having a piston therein which piston is thus actuated in response to volume changes of the liquid in the system and which piston is operatively connected to a valve in the water circuit. A manual control is provided by the addition of another cylinder and piston in which the piston is manually settable to change the operating range of the first piston. The system includes a substantial length of capillary tubing which tubing may be disposed in various locations to obtain an integrated sensing for the actuation of the valve. Thus it is possible with the above described device to obtain sensings to control the valve from the ambient temperature in the passenger compartment, the temperature of the air issuing from the heater, the temperature of the air entering the heater, the temperature of the water returning from the heater core to the engine radiator or from any one or a combination of these locations.

Referring now more particularly to the drawings, we have shown in Figure 1 a valve body indicated generally at 10 through which water in the water circuit between the heater core and the car engine flows through fittings 11 and 12. The valve member itself is indicated at 13 and comprises a disc having an annular groove in which is seated a rubber ring 14. The valve stem is indicated at 15 and has an extension 16 to which is secured a guide flange 17 having perforations 18 for the passage of water. The guide flange 17 rides in the fitting 11 to maintain the stem 15 in alignment.

As best seen in Figure 2, the valve stem 15 terminates in the piston 19 operating in the cylinder 20. The stem 15 is provided with the annular groove 21 in which is mounted a split ring 22 against which the cup 23 bears by means of its central flange 24. Its peripheral flange 25 serves as a seat for the compression spring 26, the other end of which bears against a shoulder 27 in the valve body 10. The spring 26 bearing against the flange 25 of the cup 23 insures the valve being moved toward the right to open position when no pressure is on the piston 19.

The valve body is flanged as indicated at 28 and a cylinder mounting plate 29 is secured to the flange 28 as by means of the fastening 30.

Secured to the cylinder 20 is a chamber 31 having an internal annular shoulder 32 in opposition to the flange 33 on the cylinder body. A diaphragm 34 is clamped between the shoulder 32 and flange 33 by an inturned flange 35 forming a portion of the chamber 31. Preferably the chamber 31 is secured and sealed to the mounting plate 29 by a washer 37 held in place by a snap ring 38 seating in a suitable groove in the cylinder 20, and a compression gasket 36.

The chamber 31 is substantially duplicated as seen in Figure 1 by a chamber 39 similarly secured to a cylinder 40 in clamping relation with a diaphragm 41, and the cylinder 40 contains a piston 42. In the structure of Figure 1 the cylinder 40 is externally threaded, and a nut 43 is in engagement therewith and bears against a washer 43a. A compression spring 43b is held between the washer 43a and a shell member 44. The shell member 44 has a closing member 45a provided with a threaded boss 44b, through which is threaded the shank 45b of the piston. Adjustment is accomplished by means of the knob 45, acting through the shank 45b, piston 42 and diaphragm 41.

The chambers 31 and 39 are connected by a substantial length of capillary tubing indicated at 46. Preferably one of the chambers, 31 or 39, is provided with an additional length of capillary tubing 47 which in its initial condition may serve as a charging tube and which is then sealed at its ends. It will be understood that in some installations the tube 47 may be left as short as will permit of its use as a charging tube while in other installations the tube 47 may itself have substantial length and be used as a sensing element in various locations, as will be more fully pointed out hereinafter.

From the foregoing description it will be understood that the chambers 31, 39 and the tubing 46 and 47 all taken together constitute a closed and sealed system. This system is charged preferably through the tube 47 with a liquid which has the characteristic of expanding in volume with an increase in temperature and which has a fairly constant viscosity over a wide range of temperatures as pointed out above. It will now be clear that with any given setting of the manual control knob 45, any expansion of the liquid in the sealed system will cause the piston 15 to move toward the left to a position to reduce the valve opening or ultimately to shut the valve off entirely. Since, after the valve has shut, sensings may still tend to push the piston 15 toward the left, means are provided to permit an override. Thus, after the valve disc 13 has contacted the limiting shoulder portion 10a, the spring 43b will yield, permitting movement of the members 39, 40, 43 and 43a toward the left so that no strain is placed upon the structure.

If there is a drop in temperature to which the tubing 46 or 47 is subjected, the liquid within the system will contract and pressure will be removed from the piston 15 whereupon the spring 26 will return the valve 13 toward open position.

It will be understood that with any given set of temperature sensings and with the valve in any given position resulting therefrom the position of the valve can be adjusted at will by means of the control knob 45. If the control knob 45 is turned to screw the member 45b into the boss 44b, the piston 42 will be moved toward the left and the piston 15 will be forced to move a corresponding distance toward the left. Similarly, if the member 45a is unscrewed slightly from the boss 44b, the piston 15 will follow the movement of the piston 42.

The diaphragms 34 and 41 are rubber, either natural or synthetic, and serve to seal the liquid system. The pressure of the liquid is transmitted through the diaphragms respectively to the pistons 15 and 42.

The liquid which is used in the system may be any liquid which exhibits the characteristics pointed out above. As an example of a highly satisfactory liquid, although it is somewhat expensive, we may cite Silicone. As another example of a liquid which is much less expensive, we may cite any ordinary S. A. E. 10W engine lubricating oil.

In charging the system through the charging tube 47 it will be found desirable to charge the system to a pressure of about 500 pounds per square inch. In actual operation the operating pressures within the system may attain a value of 2000 or 3000 pounds per square inch. For these reasons the chambers and capillary tubings must be of such strength that they can withstand the operating pressures likely to be encountered.

In Figures 3, 4 and 5 we have shown various ways in which our invention may be applied to an automotive heating system. Thus, in Figure 3 the valve is again indicated generally at 10, and in this instance it is placed in the line between the engine indicated at E and the heater core indicated at H. In this particular embodiment the dashboard is indicated at D and the manual control 45 is located on the dashboard. Thus the capillary tubing 46 is positioned to sense the temperature of the ambient air in the passenger compartment. The charging tube 47 in this particular embodiment is led through the duct to which air passes from the heater to the passenger compartment indicated at AO and then it is led into the duct through which the water is returned from the heater core H to the engine E. This duct is indicated at WO. In Figure 3 air enters the heater through the duct indicated at AI and is fed to the heater core H by the fan F.

In Figure 4 corresponding parts have been given the same reference numerals. Here the tube 47 has not been extended as in Figure 4, but the tube 46 in this instance is positioned in part within the duct AO to which the air issuing from the heater passes. Thus, the element 46 can sense not only the temperature of the ambient air in the passenger compartment but the temperature of the hot air issuing from the heater.

In Figure 5 again the various parts have been given corresponding reference numerals. Here the element 46 is positioned as in Figure 4, but the tube 47 has been extended and has been placed in the air path in the duct AI so as to sense the temperature of the outside air entering the heater.

It will be clear that numerous modifications may be made in the disposition of the elements and that more tubes 47 could be provided to sense yet other temperatures if found to be advisable. It will therefore be clear that we do not intend to limit ourselves to the specific embodiments shown but that we are to be limited by the claims which follow.

Having now fully described our invention, what we claim as new and desire to secure by Letters Patent is:

1. In an automobile having a hot water heating system wherein engine radiator water is circuited through a heater core, and wherein outside air is blown past said heater core and into the passenger compartment of said car there being a valve in said water circuit, a thermostat system comprising a chamber associated with the dashboard of said automobile and a chamber associated with said valve, each of said chambers including a cylinder and a piston therein, the piston of the chamber associated with the dashboard being manually settable in relation to its cylinder, and the piston of the chamber associated with the valve being operatively connected to said valve, each of said chambers constituting a thermostat, said thermostat associated with said valve sensing hot water temperature, and said thermostat associated with said dashboard sensing car temperature, capillary tubing connected to said chambers, said chambers and tubing being charged with a liquid which changes in volume in response to changes in temperature, said capillary tubing being of substantial length, and a portion of said tubing being disposed to sense the temperature of water flowing through said heater.

2. A thermostat system according to claim 1, wherein a portion of said tubing is disposed to sense the temperature of water leaving said heater core.

3. A thermostat system according to claim 1, wherein the tubing connected to said chamber comprises a length of tubing connecting said chambers together, and an additional length of tubing connected to one of said chambers at one end and sealed at its other end, said additional length of tubing being disposed to sense the temperature of water leaving said heater core.

SERGIUS VERNET.
ALLAN C. HOFFMAN.

References Cited in the file of this patent
UNITED STATES PATENTS

| Number | Name | Date |
|---|---|---|
| 1,971,532 | McAuley | Aug. 28, 1934 |
| 2,164,882 | Miles | July 4, 1939 |
| 2,208,149 | Vernet | July 16, 1940 |
| 2,214,236 | Seldon | Sept. 10, 1940 |
| 2,221,347 | Giesler | Nov. 12, 1940 |
| 2,293,947 | Persons | Aug. 25, 1942 |
| 2,298,163 | Raney | Oct. 6, 1942 |
| 2,307,723 | Anderson | Jan. 5, 1943 |
| 2,479,307 | Camilli | Aug. 16, 1949 |
| 2,490,919 | Raney | Dec. 13, 1949 |
| 2,507,911 | Keller | May 16, 1950 |
| 2,534,497 | Albright | Dec. 19, 1950 |